A. G. SEAMAN.
MEANS FOR HANDLING AND DISTRIBUTING PARCELS, BALES, LOADS, AND OTHER ARTICLES.
APPLICATION FILED JULY 9, 1912.
1,100,262.
Patented June 16, 1914.
5 SHEETS—SHEET 2.
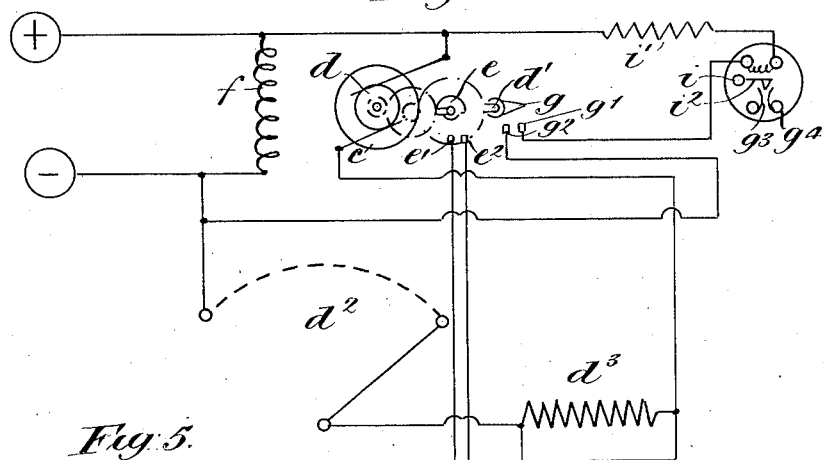
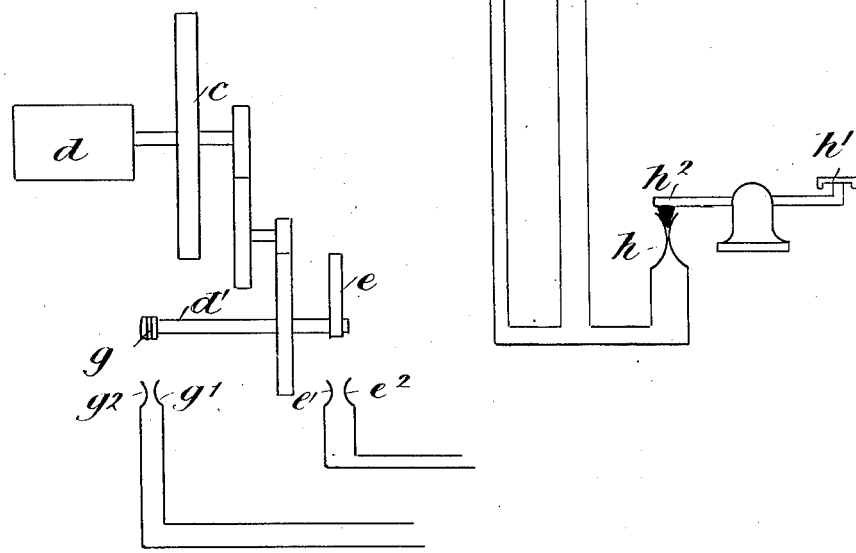
Witnesses:
Peter Henry.
H. D. Penney.
Inventor:
Arthur G. Seaman.
By his Attorney,
F. H. Richards.

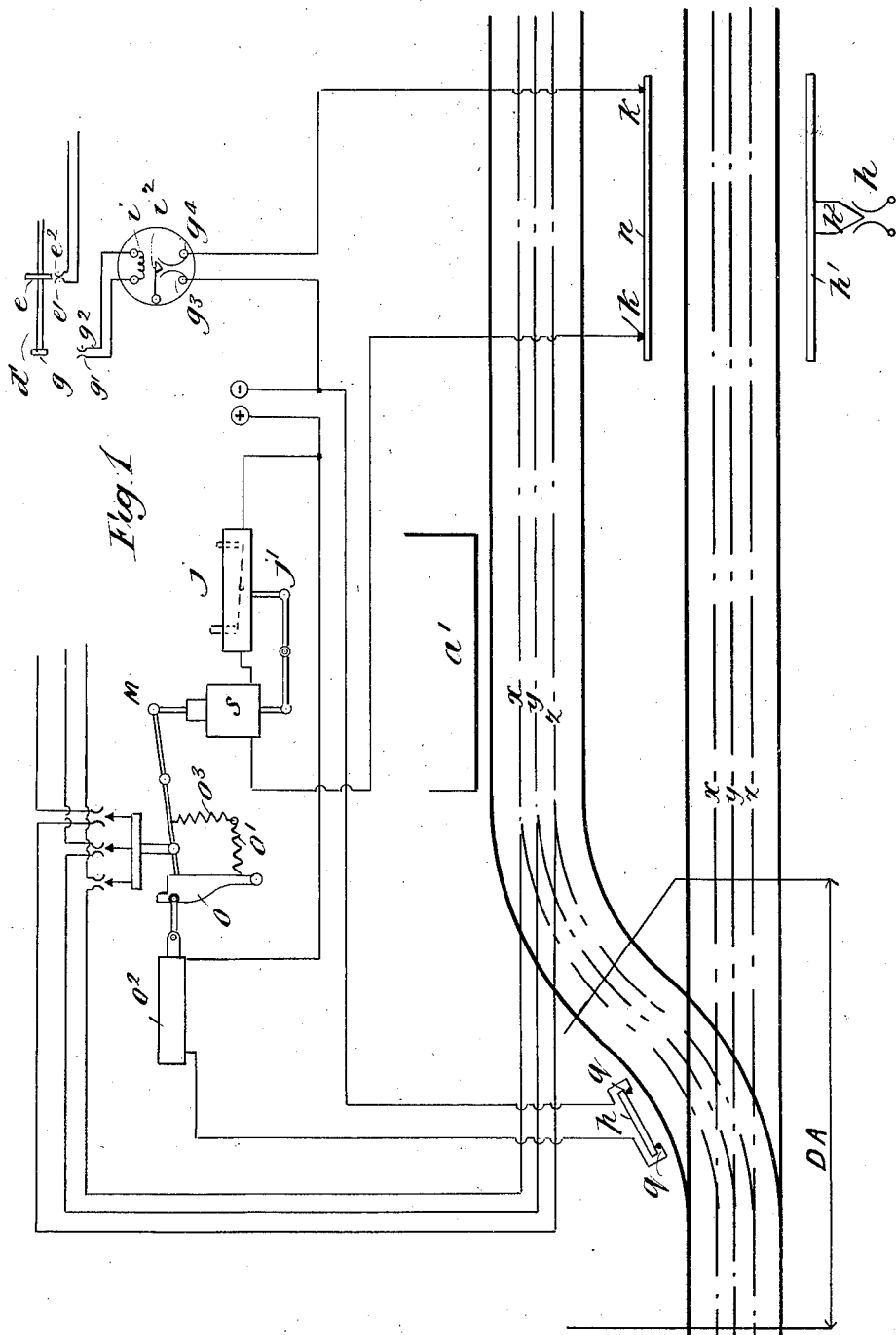

A. G. SEAMAN.
MEANS FOR HANDLING AND DISTRIBUTING PARCELS, BALES, LOADS, AND OTHER ARTICLES.
APPLICATION FILED JULY 9, 1912.
1,100,262.
Patented June 16, 1914.
5 SHEETS—SHEET 3.
Fig. 3.
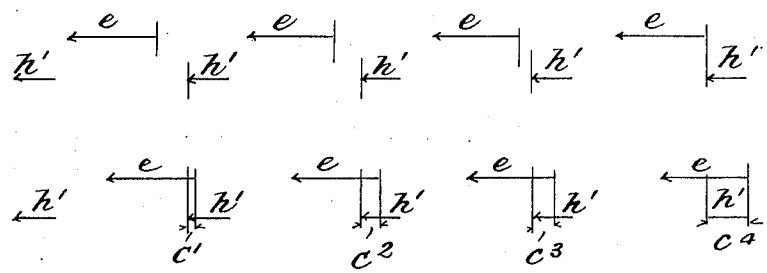
Fig. 4.$^a$
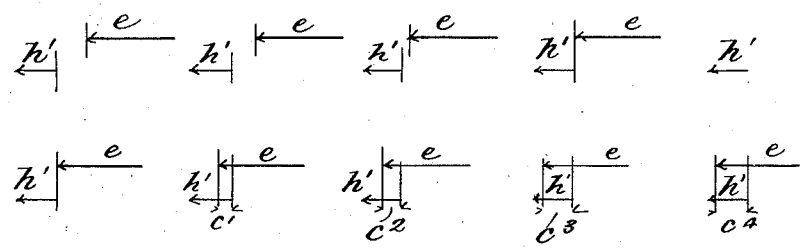
Witnesses:
Inventor:
Arthur G. Seaman.
By his Attorney,

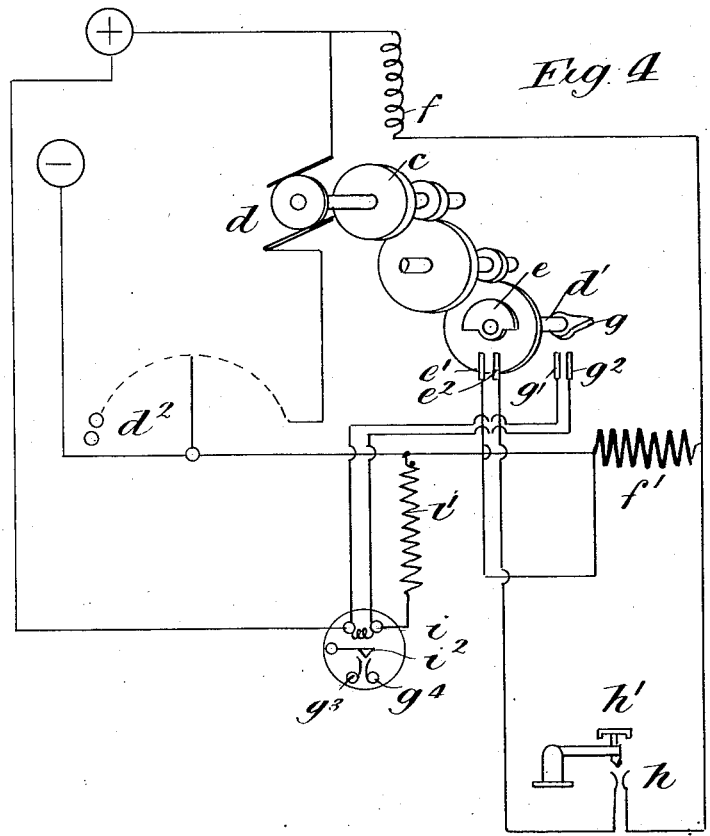
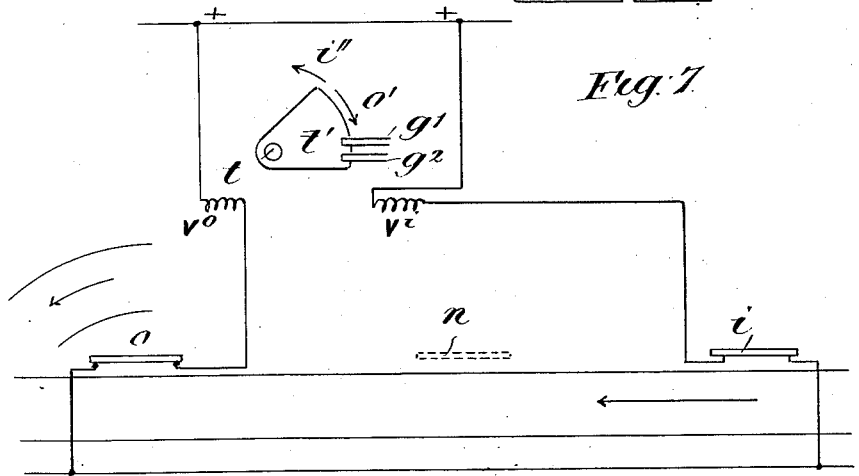

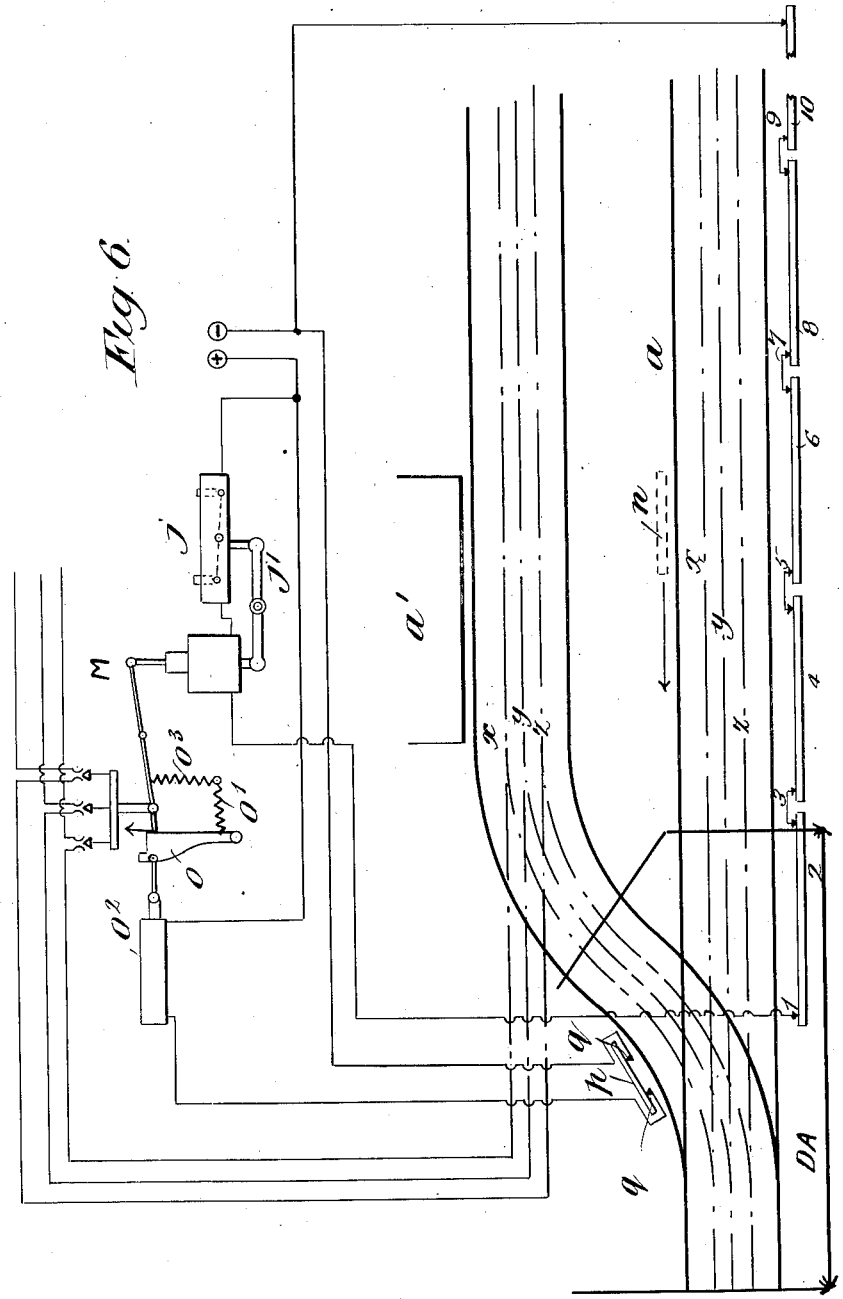

UNITED STATES PATENT OFFICE.

ARTHUR GEORGE SEAMAN, OF BOWDEN, ENGLAND.

MEANS FOR HANDLING AND DISTRIBUTING PARCELS, BALES, LOADS, AND OTHER ARTICLES.

1,100,262.	Specification of Letters Patent.	Patented June 16, 1914.

Application filed July 9, 1912. Serial No. 708,446.

*To all whom it may concern:*

Be it known that I, ARTHUR GEORGE SEAMAN, a subject of the King of Great Britain, residing in Bowden, Cheshire, England, have invented certain new and useful Improvements in and Relating to Means for Handling and Distributing Parcels, Bales, Loads, and other Articles, of which the following is a specification.

This invention relates to improvements in and relating to means for handling and distributing parcels, bales, loads, or other articles, and it relates to a system in which a number of self propelled vehicles are arranged to travel upon a track at predetermined intervals of time or space calling at bays, stations, or sidings to deliver their loads, and it has for its object to provide for the automatic dispatch of a carriage from a station, siding, bay, or other point or place where it is at rest on to the main line in a manner that there shall be no collision between it and the vehicles already traveling thereon.

Now according to the present invention I provide means for controlling the dispatch of the vehicles from the siding which means are themselves controlled by the fact that there will or will not be a sufficient interval of time or space between the vehicles on the main track to permit the vehicle from the siding to take its place upon the said main track without collision with the vehicles already traveling thereon.

In order that the invention may be the better understood, drawings are appended illustrating an embodiment of the invention, and in which:—

Figure 1. is a diagrammatic plan of a dispatching station arranged according to the present system. Fig. 2. is a similar view of one form of regulating device for the dispatch of the carriages. Fig. 3. is a diagrammatic view illustrating the operation of the parts shown in Fig. 2. Fig. 4. is a similar view of an alternative form of regulating device. Fig. 4ª. is a diagrammatic view showing certain operations of the parts shown in Fig. 4. Fig. 5. is a plan view showing the arrangement of certain parts of the regulator mechanism. Fig. 6. is a diagrammatic view illustrating an arrangement whereby the dispatch of the carriage can only take place if a certain stretch of main track is entirely free, so that when the dispatched carriage enters the main track there will be room for it. Fig. 7. is a diagrammatic view illustrating an arrangement whereby the dispatch of the carriage can only take place if all the carriages which have entered a certain stretch of main track have already left it.

Starting with the assumption that a stream of the maximum possible safe number of carriages is circulating around a main track, all at the same uniform full speed, and all separated by the same minimum safe interval, the stream could be said to comprise " carriage, interval, carriage, interval ". If one carriage were turned into a siding, that part of the stream would then comprise " carriage, interval, gap, interval, carriage ". It is clear that if a carriage is to be dispatched out of a siding into the main stream, it must be made to take its place automatically in this " gap ", and that the carriage must be started at exactly the right moment so that it will reach the points leading out of the siding at the same time as the " gap ".

Taking the "time-interval" as the basis of control, we arrange the controlling apparatus as follows:—First the "danger area" DA, see Fig. 1, is ascertained. This is the area within which no parts of two different carriages, one on the main track running at constant full speed, and one on the siding track being accelerated to full speed, must ever be at one and the same time. Then the average time is ascertained which will elapse from the time a carriage is started from the dispatching station $a^1$, Fig. 1, until it has passed completely through the danger area D. A. From this time, the distance on the main track is calculated which a carriage moving at constant full speed will travel in that time. This distance is laid off backward, or up-stream, from the entry into the danger area. A tread rail $n$, Fig. 1, is placed here. If at the time that a carriage running at full speed traverses the tread-rail another carriage is dispatched from the station $a^1$, the two carriages would enter the "danger area" at the same time, and there would be a collision. If the carriages running at constant full speed on the main track, are at practically equal distances apart, they will pass a given place, say the tread rail $n$ at equal time intervals, and they will so to speak "beat time" on the tread rail. If there is a carriage missing, that is, if there is room for another carriage to come into the stream, a "beat" will be missed when the "gap" passes the tread rail. To make it impossible to start a carriage from a siding, except in time with this "beat" on the tread rail $n$, I use a starting regulator, which switches current on to the starting magnet S circuit, Fig. 1, for short periods which are in time with the "beat". As the "beat" will not be quite regular and as moreover a carriage may only be started when a "beat" on the tread rail $n$ is "missed," I employ a "starting regulator" which takes the form of a motor driven pendulum or "metronome" switch. The speed of the driving motor is automatically regulated, in a manner to be described later, so that one of the contacts of the tread rail $n$ is periodically connected to a pole of the power supply mains synchronously with the "beat" of the carriages on the tread rail $n$. Whenever a "beat" is "missed," that is, whenever there is room on the main track for the carriage which is waiting to be dispatched, the following circuit will be closed: $g^3$, $g^4$, $k$—$k$ of tread rail $n$, solenoid S, starting switch $j$ (which will have been closed by the operator as soon as the carriage is ready to leave) and back to negative pole. The completion of this circuit causes the solenoid S to close the main switch M, in this case a 3 phase current supply $x$ $y$ $z$ is shown, which is held closed by the catch O under the action of the spring $O^1$ while the carriage starts, speeds up and enters the main track. When it passes over the tread rail $p$, the solenoid $O^2$ withdraws the catch O, thus allowing the spring $O^3$ to again open the main switch M.

In Figs. 2 and 5 which are diagrammatical drawings in elevation and plan respectively, of the timing switch, $d$ is the armature of a shunt-wound motor having a fly wheel on the same shaft. The motor drives a shaft $d^1$ through a suitable speed reducing train of gear wheels or the like, so that the number of revolutions per minute of the shaft $d^1$ corresponds to the average number per minute of carriages passing the tread rail $n$, see Fig. 1, above referred to. This shaft $d^1$ carries a semicircular contact piece or half commutator $e$, and a contact arm $g$, which can connect contact brushes $e^1$, and $e^2$, and $g^1$ and $g^2$ respectively. When a tread rail $h^1$ on the track is depressed, an insulating piece $h^2$ is withdrawn from between two spring contacts $h$ and allows these to touch each other. Current can only flow through the contacts $h$ when the tread rail $h^1$ is depressed, and the half commutator $e$ makes contact between $e^1$ and $e^2$ at the same time. Then resistance $d^3$, in series with the armature $d$, is short-circuited, which causes the motor to run faster. A speed regulating rheostat $d^2$, in series with the armature and the aforesaid resistance $d^3$ provides a means of setting by hand the speed of the motor slightly slower than the "beat" of the carriages on the tread rail, see Fig. 1, and contact of the wheel of the vehicle with the rail $h^1$ closes the contact $h$ while contact of the said wheel with the rail $n$ opens the circuit at the contact points $k$, $k$. A relay may also be provided and may consist of a magnet or solenoid $i$, an insulating piece $i^2$ and two spring contacts $g^3$, $g^4$, which make contact with each other so long as the magnet is energized and the insulating piece is kept from between them. These contacts $g^3$ and $g^4$ are in series with the dispatching switch $j$ and the tread rail $n$ in Fig. 1. Whenever the arm $g$ completes its connection and the tread rail $n$, Fig. 1, is not depressed, the relay switches current on to the power circuit in the siding so that the carriage can start. A resistance $i^1$ in series with the magnet coil $i$, limits the current passing through $i$, Fig. 2.

Fig. 3 illustrates diagrammatically the principle on which the short-circuiting of the aforesaid resistance $d^3$ is controlled so as to automatically vary the speed of the motor and make it agree with the average time-interval between the "beats" of the carriages on the rail. $e$ in Fig. 3 represents the duration and time of the contacts made by $e$ in Fig. 2, $h^1$ the time and duration of the contact made by $h^1$ of Fig. 2.

The motor is regulated by rheostat, $d^2$ Fig. 2 to run slightly slower than the speed which corresponds to synchronism with the "beat" of the carriages on the tread rail $h^1$. In Fig. 3 the arrows $h^1$ represent the duration of the beat of the carriages on the tread rail $h^1$ of Fig. 2, the space between the arrows representing the time intervals between the beats. Similarly the arrows $e$ represent the duration of contacts of the arm $e$ Fig. 2, and the spaces between them the time intervals between the contacts. In the figures it will be understood that an imaginary cycle of contacts is shown depicting the gradual dropping behind of the beat, and the spaces $c^1$ $c^2$ $c^3$ $c^4$ indicate the amount of time during which both contacts are closed and the resistance short circuited, and consequently the motor speeded up. In practice it will be so arranged that the desired effect will be attained when the duration of the contacts is approximately that represented by the space $c^2$.

Fig. 4, shows an alternative arrangement in which the speed regulation is effected by short circuiting a resistance $f^1$ in series with the field winding, while the motor is made to run faster instead of slower than corresponds with synchronism. In Fig. 4, the corresponding parts are all designated by the same letters and numbers as in Fig. 2, and in addition $f^1$ is the resistance in series with the field, and $i$ is a relay solenoid or magnet which as in the previous case may be connected with a resistance $i^1$ in series to the positive and negative supply. The arm $g$ short circuits this solenoid, and allows a conductive body to make contact between terminals $g^3$, $g^4$ and which are connected to the other apparatus as shown in Fig. 1.

Fig. 4ª illustrates diagrammatically the principle on which the short circuiting of the field resistance $f^1$ is controlled so as to slow down the speed whenever it gets too fast for the "beat" of the carriages on the tread rail $h^1$. In this case as in the previous example an imaginary cycle of operations is illustrated and the arrows $h^1$ indicate the duration of the beat of the carriages on tread rail $h^1$ of Fig. 4, the space between the arrows representing the time intervals between the beats. The arrows $e$ represent the duration of the contact of $e$ Fig. 4, and the spaces between them the time interval. In this case, however, the motor at Fig. 4, is regulated by the rheostat $d^2$ to run slightly faster than corresponds to the beat of the carriages on the tread rail $h^1$. The spaces $c^1$ $c^2$ $c^3$ $c^4$ indicate the times during which both the contacts $e$ and $h$ are closed simultaneously.

Fig. 6, illustrates diagrammatically the method of governing the time of starting by space intervals. In this case I employ a continuous series of tread rails extending from the danger area DA back about twice as far as the tread rail $n$ is from DA in Fig. 1. This series or chain of tread-rails consists of any convenient number of separate tread rails, and its total length is equal to the minimum space-interval that is necessary in order to leave room for the carriage that is to come out of the station. It represents "interval, carriage, interval" or "interval, gap, interval." Each of the tread-rails when "up" closes contacts in the same way as shown for tread-rail $n$ in Fig. 1, and all the contacts are connected in series. After the starting switch $j$ has been closed the carriage will start from the siding immediately all the tread rails of the series are up, for then the solenoids will be energized and the main switch M closed.

In the drawings the tread rails are numbered 2, 4, 6, 8, and 10, and are connected in series with each other by conductors 1, 3, 5, 7 and 9. The tread-rail $n$ of Fig. 1, is shown dotted in Fig. 6, in order to indicate the positions of the tread-rails in relation to it and to the starting point $a^1$.

Alternatively I may employ a discriminating controller, as described in the British Patent No. 17344 of 1908, installed in the dispatching station, and used to count the number of carriages entering and leaving the said stretch of main track, referred to in the foregoing description. At each end of this stretch I place a tread rail $i$ and O, Fig. 7. The tread rail $i$ is connected to the magnet $vi$ of the aforesaid discriminating controller which turns the shaft or spindle $t$ of the controller, one tooth in one direction, shown by arrow $i^{11}$, and the tread rail O to the other magnet $vo$ which makes the controller spindle turn one tooth in the opposite direction, shown by arrow $O^1$. The controller spindle $t$ has mounted on it a contact arm or segment $t^1$ which in the position shown electrically connects contact terminals $g^1$, $g^2$ together. These latter are connected to the remaining apparatus in the same way as the correspondingly marked contacts $g^1$, and $g^2$, in Figs. 1, 2 and 4.

The position of tread rail switch is shown dotted in Fig. 7, and marked $n$ corresponds to the position of the tread rail $n$, in Fig. 1, and is added here to show positions of tread rails $i$ and O in this arrangement in relation to that of tread rail $n$ in the above-mentioned arrangement. The distance from O to $i$ represents the length of "interval—carriage—interval" or "interval—gap—interval."

The controller having been set to make contact, as shown, when there is no carriage on the stretch $i$ to O, the first carriage passing tread rail $i$, causes magnet $v^1$ to move contact piece $t^1$ one step or tooth in the direction $i^2$, and breaks the connection between $g^1$ and $g^2$. If when this first carriage passes point $n$, a second carriage following it passes tread rail $i$, the controller will be moved a second step farther away from its contact position. It will now require tread rail O to be actuated twice so that magnet $vo$ can return contact $t^1$ two steps in the opposite direction $O^1$ before contact is made between terminals $g^1$ and $g^2$. In other words the controller counts all the carriages passing into it and out of the stretch $i$ to O, and its position is determined by the balance of the carriages still between $i$ and O. Unless all the carriages that entered the stretch have left it, that is, unless the stretch is empty, a carriage cannot be started out of the siding, because the connection $g^1$ and $g^2$ is broken.

It is clear from the foregoing description that in place of the tread rails, rubbing electrical contacts may be used.

Claims.

1. Means for the safe dispatch of vehicles from a siding or other place off the main track, comprising a power circuit, a switch in said circuit and means controlling said switch whereby the said power circuit is closed when a gap of sufficient length to safely permit the introduction of another vehicle occurs in the succession of vehicles on the main track.

2. Means for the safe dispatch of vehicles from a siding or other place off the main track, comprising a power circuit, and means in said circuit whereby the current is allowed to pass to the vehicles on the siding when a gap of sufficient length to safely permit the introduction of another vehicle occurs in the succession of vehicles on the main track.

3. Means for the safe dispatch of the vehicles from a siding or other place off the main track, comprising a power circuit, a switch for said circuit, means controlling the power switch whereby the said power circuit is closed when a gap of sufficient length to safely permit the introduction of another vehicle occurs in the succession of vehicles on the main track, and means for varying the intervals between the operation of the controlling means according to the variation in the speed of the said vehicles upon the main track.

4. Means for the safe dispatch of the vehicles from a siding or other place off the main track, comprising a power circuit, a switch in said circuit and means controlling the said switch so that the power circuit is closed when a gap of sufficient length to safely permit the introduction of another vehicle occurs in the succession of vehicles on the main track, and an electric motor for operating said power switch controlling means.

5. Means for the safe dispatch of the vehicles from a siding or other place off the main track, comprising a power circuit, a switch in said circuit and means controlling the said switch so that the power circuit is closed when a gap of sufficient length to safely permit the introduction of another vehicle occurs in the succession of vehicles on the main track, an electric motor for operating said power switch controlling means, and means for varying the intervals between the closing of the said power switch controlling means according to the variation in the speed of the said vehicles upon the main track.

6. Means for the safe dispatch of the vehicles from a siding or other place off the main track, comprising a power circuit, a switch in said circuit and means controlling the said switch so that the power circuit is closed when a gap of sufficient length to safely permit the introduction of another vehicle occurs in the succession of vehicles on the main track, an electric motor for operating said power switch controlling means, a rheostat for regulating the speed of the motor, and means for varying the intervals between the closing of the said power switch controlling means according to the variation in the speed of the said vehicles upon the main track.

7. Means for the safe dispatch of the vehicles from a siding or other place off the main track, comprising a power circuit, a switch in said circuit and means controlling the said switch so that the power circuit is closed when a gap of sufficient length to safely permit the introduction of another vehicle occurs in the succession of vehicles on the main track, an electric motor for operating said power switch controlling means, a rheostat for regulating the speed of the motor, a resistance in circuit with said motor and means operated by the vehicle on the main track whereby the resistance is cut out of the motor circuit.

8. Means for the safe dispatch of the vehicles from a siding or other place off the main track, comprising a power circuit, a switch in said circuit and means controlling the said switch so that the power circuit is closed when a gap of sufficient length to safely permit the introduction of another vehicle occurs in the succession of vehicles on the main track, an electric motor for operating said power switch controlling means, a rheostat for regulating the speed of the motor, a resistance in the armature circuit and means for short circuiting this resistance operated by the vehicles on the main track.

9. Means for the safe dispatch of the vehicles from a siding or other place off the main track, comprising a power circuit, a switch in said circuit and means controlling the said switch so that the power circuit is closed when a gap of sufficient length to safely permit the introduction of another vehicle occurs in the succession of vehicles on the main track, an electric motor for operating said power switch controlling means, a rheostat for regulating the speed of the motor, a resistance in the motor circuit and means for short circuiting this resistance operated by the vehicles on the main track.

10. Means for the safe dispatch of the vehicles from a siding or other place off the main track, comprising a power circuit, a switch for said circuit, a magnet operating said switch, a hand operated switch in said magnet circuit, a catch holding said first named switch in the closed position, a magnet for releasing the catch, a pair of contacts normally closed in said first magnet circuit, said contacts being opened on the passage of the vehicle out of the siding, a pair of contacts normally open in the second magnet circuit said contacts being closed on the passage of the vehicle on the main track, and circuit closing means operating to close the first magnet circuit when a gap of sufficient length to safely permit the introduction of another vehicle occurs in the succession of vehicles on the main track.

11. Means for the safe dispatch of the vehicles from a siding or other place off the main track, comprising a power circuit, a switch for said circuit, a magnet operating said switch, a hand operated switch in said magnet circuit, a catch holding said power switch in the closed position, a magnet for releasing the catch, a pair of contacts normally closed in said first magnet circuit, said contacts being opened on the passage of the vehicle on the main track, a pair of contacts normally open in the second magnet circuit said contacts being closed on the passage of the vehicle out of the siding, circuit closing means operating to close the first magnet circuit when a gap of sufficient length to safely permit the introduction of another vehicle occurs in the succession of vehicles on the main track, a shunt wound electric motor, a spindle driven by said motor, a resistance in series with the armature of said motor, an arm upon said spindle closing contacts in the power switch circuit, a body upon said spindle closing contacts in the resistance circuit, and a second pair of contacts in said circuit whereby the resistance in the armature circuit may be short circuited, said second pair of contacts being closed by means of the vehicles on the main track.

In witness whereof I have hereunto set my hand in the presence of the undersigned witnesses.

ARTHUR GEORGE SEAMAN.

Witnesses:
 ERNOLD SIMPSON MOSELEY,
 MALCOLM SMETHURST.